W. Adamson,
Process of Extracting Resins from Wood.
117135        PATENTED JUL 18 1871
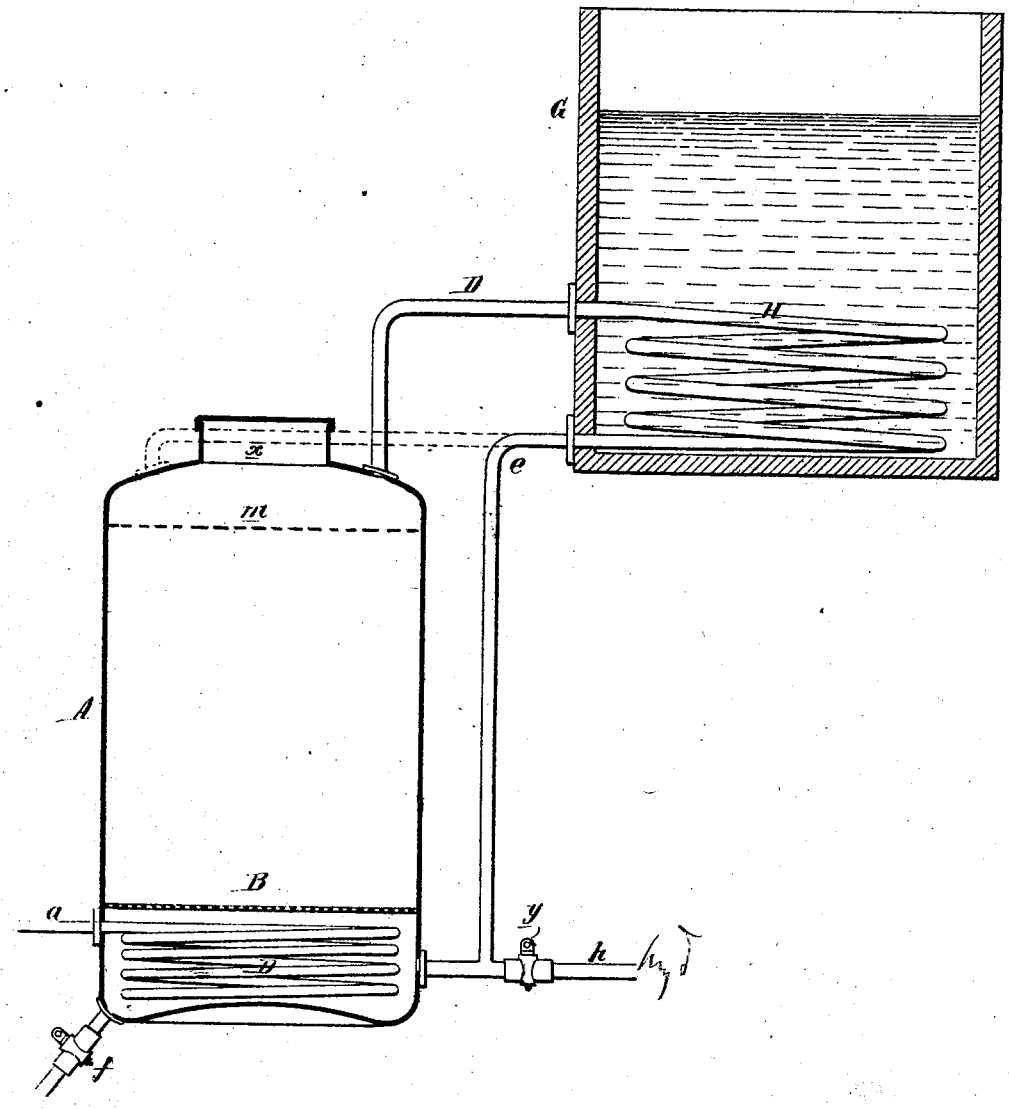

UNITED STATES PATENT OFFICE.

WILLIAM ADAMSON, OF PHILADELPHIA, PENNSYLVANIA.

IMPROVEMENT IN EXTRACTING RESINS AND GUMS FROM WOOD.

Specification forming part of Letters Patent No. 117,135, dated July 18, 1871.

*To all whom it may concern:*

Be it known that I, WILLIAM ADAMSON, of Philadelphia, county of Philadelphia, State of Pennsylvania, have invented a Process of Extracting Resinous and other Gummy Matters from Wood, of which the following is a specification:

My invention consists in extracting resinous and gummy matters from wood by the application thereto of hydrocarbons, substantially in the manner too fully explained hereafter to need preliminary description, the product of this treatment being available in the manufacture of different articles of commerce.

In carrying my invention into effect I have used the apparatus illustrated in the drawing; but it should be understood in the outset that I do not limit myself to that or any other apparatus, for many different appliances may be employed in practicing the process.

In the drawing, A represents a closed vessel of iron or any other material which will resist the chemical action of the contents. Within the vessel and extending across the same a short distance from the bottom is a perforated diaphragm, B, on which is placed the substance to be treated. This may consist, for instance, of chips, shavings, or sawdust of yellow pine, this wood containing a large proportion of resinous and gummy matter. In the space between the diaphragm and the bottom of the vessel I place a coil, D, or its equivalent, to which steam is introduced through a pipe, $a$, and to the lower corner of the vessel I attach a discharge-pipe and faucet, $f$. A pipe, D, extends from the top of the vessel into a condenser, G, where it assumes the form of a coil, H, the latter terminating in a pipe, $e$, which communicates with the space between the perforated diaphragm B and the bottom of the vessel. The vessel should have a man-hole, $x$, for the introduction of the material, the hole being furnished with a suitable detachable cover; and the vessel may also be furnished with a suitable safety-valve.

We will suppose that the pine chips or shavings are confined in the vessel between the top of the same and the perforated diaphragm B, and that a supply of hydrocarbon—by preference, benzine, benzole, gasoline, or other equivalent product of the distillation of petroleum or coal—has been introduced through a pipe, $h$, into the space below the diaphragm, the supply, after reaching or nearly reaching the diaphragm, being cut off by closing the cock $y$. On introducing steam into the coil, vapor will rise from the hydrocarbon, and, after penetrating the mass of chips or shavings, will pass through the pipe $d$ into the coil H, and, after being there condensed, will pass through the pipe $e$ to the vessel below the diaphragm, to be there again converted into vapor by the steam-coil, the vapor pursuing its previous course through the chips or shavings prior to being again condensed. The vapor, as it thus permeates the chips or shavings, at once attacks the gummy or resinous ingredients of the wood, and these substances, being dissolved, flow freely through the perforated diaphragm and lodge on the bottom of the vessel, from which they may be withdrawn, from time to time, through the discharge-cock $f$. So effective is the vapor that in a comparatively short time after the commencement of the process nothing remains on the perforated diaphrapm but a mass of fiber deprived of gummy and resinous matter, which latter may be converted into turpentine and other marketable products by distillation or other treatment. I have succeeded in obtaining the desired extract from shavings of pine wood by the application of benzine under a pressure of from five to ten pounds per square inch.

I have shown in the drawing and have described above what I consider economical appliances wherewith to carry my invention into effect; but it should be understood that the process can be carried out in an open vessel, the objection to this, however, being the loss of the benzine or its equivalent. The wood may even be subjected to the direct action of benzine or its equivalent, in open or closed vessels, but I prefer the application of vapor under pressure, as described. The process may be carried into effect by the combined direct application of hydrocarbon and the vapors of the same. For instance, there may be a second perforated diaphragm, as shown by the dotted lines $m$, near the top of the vessel, the chips or shavings being confined between the two diaphragms; and the condensed hydrocarbon vapor may be permitted to pass directly from the coil in the condenser onto the upper diaphragm, through which it will pass in streams and percolate through the mass of chips until it is vaporized by the steam-coil or other heat-generator, and the vapor again ascends to be condensed as before. In this case there will be a direct application of liquid hydrocarbon to the chips, by descending streams, simultaneously with the application of ascending hydrocarbon vapor. Other appliances and apparatus for carrying out my invention, either by the direct application of liquid hydrocarbons or by the application of vapors of the same, will readily suggest themselves to those who are familiar with chemical processes and apparatus.

I claim—

The process of extracting resinous and gummy matters from wood by the application thereto of hydrocarbon, substantially in the manner described.

In testimony whereof I have signed my name to this specification in the presence of two subscribing witnesses.

WILLIAM ADAMSON.

Witnesses:
  CHS. F. A. SIMONIN,
  H. HOWSON.